Dec. 20, 1949     I. C. BLAKE ET AL     2,491,640
DEFERRED ACTION BATTERY
Filed June 20, 1945
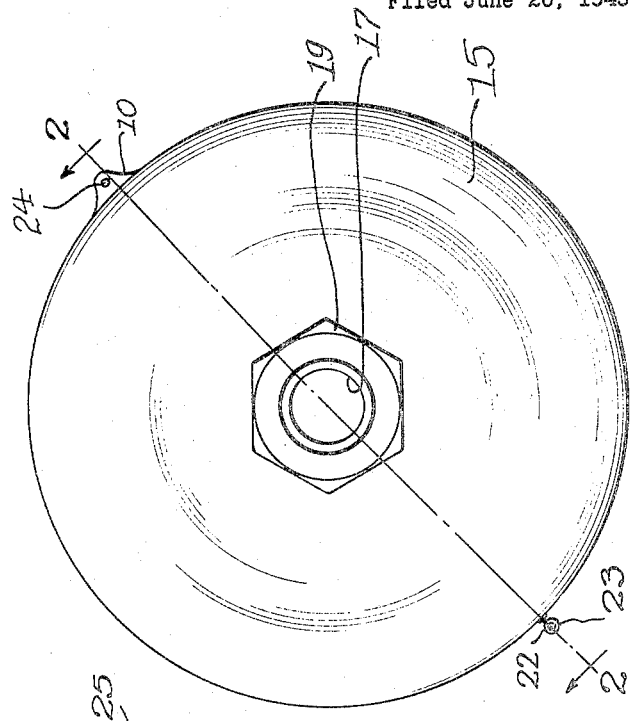
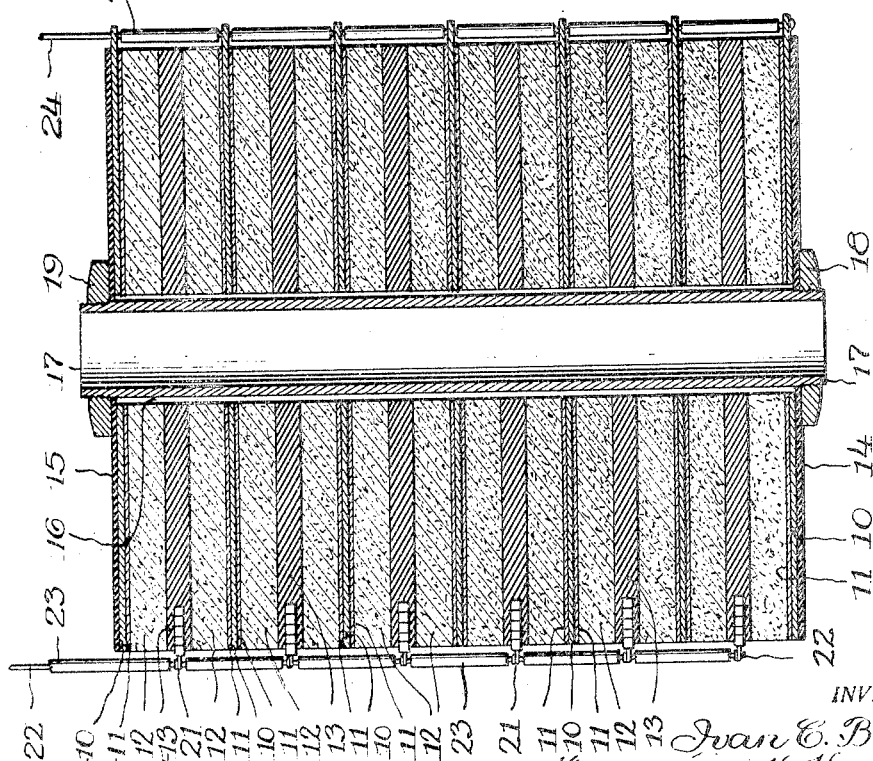
INVENTORS
Ivan C. Blake
Lawrence H. Harriss
and John B. Mullen,
Tesch and Darbo, Attys Patented Dec. 20, 1949

2,491,640

UNITED STATES PATENT OFFICE 2,491,640

DEFERRED ACTION BATTERY

Ivan C. Blake, Lawrence H. Harriss, and John B. Mullen, Elgin, Ill., assignors to Burgess Battery Company, Freeport, Ill., a corporation of Delaware Application June 20, 1945, Serial No. 600,454

2 Claims. (Cl. 136—114)

This invention relates to primary batteries and particularly to primary batteries of the deferred action type. It relates especially to a deferred action battery which is adapted to be activated by being immersed in water. The battery of the invention is intended especially for use in operating an emergency signal at sea. The signal may be a light to indicate the presence of a person who has become stranded by shipwreck or other cause. It may also be an electronic apparatus floating on the water and emitting a signal which can be detected at a distant point. The battery of the invention is adapted to energize the signal and to be activated by immersion in water, which may be the fresh water of an inland lake or river or the salt water of the ocean.

It is the primary purpose of the invention to provide a battery which is capable of producing a signal of the character mentioned and is adapted to be rendered operative by being immersed in plain water, salt water, or an aqueous electrolyte solution.

It is another object of the invention to provide a battery of the character described which may be immersed continuously in water without suffering any ill effects from the immersion.

It is a further object of the invention to provide a battery of the character described which is capable of delivering a high output of electric energy. If the signal is a light it is desirable that it be as bright as possible. With an electronic signal apparatus, the battery energizes both the filament and anode circuits of the electron tubes, and considerable energy is required.

It is a further object of the invention to provide a battery of the character described which may stand idle for a long period of time before being used without suffering any substantial deterioration.

Other objects and advantages will become apparent as the following description progresses, which is to be taken in conjunction with the accompanying drawing in which:

Fig. 1 is a plan view of the battery of the invention; and

Fig. 2 is a sectional view taken along line 2—2 of Fig. 1.

The battery of the invention comprises a plurality of electrically connected cells consisting of a series of juxtaposed elements. The particular battery illustrated and described is in the form of a stack of superimposed disc-shaped elements, each having a central opening whereby it is annular in shape. The openings are arranged to coincide with each other, and a tubular member passes through them and is arranged to hold the elements together under pressure contact with each other.

The first element, starting at the top as the battery is shown in the drawing, is the relatively thin anode 10, which is composed of magnesium. The second element is a thin sheet 11 of bibulous electrically non-conductive material, such as porous blotting paper. The next element is a pre-compressed mass 12 of depolarizing material, which may be composed of finely divided manganese dioxide, carbon and an electrolyte compound, held together in the form of a firm unitary body by a binder. The manganese dioxide may be in any of the forms commonly used as a depolarizer, such as natural manganese dioxide ore or an artificial manganese dioxide produced by a chemical or electrolytic process. The finely divided carbon imparts electrical conductivity to the mass, and may be composed of powdered graphite or carbon black. The electrolyte compound may be any suitable compound, but is preferably one which is substantially neutral. Sodium chloride has been found to be satisfactory, and is preferred, although other compounds such as ammonium chloride, potassium chloride, barium chloride, mangesium sulfate and the like, may also be used. If the battery is to be activated by immersing in sea water or other aqueous solution of electrolyte compound, the electrolyte compound may be omitted from the body 12.

The binder may be of any suitable composition, the synthetic resins being satisfactory for the purpose, such as polyvinyl acetate, the copolymer of vinyl acetate and vinyl chloride, ethyl cellulose, cellulose acetate, polyvinyl alcohol or the like. Polyvinyl alcohol is preferably incorporated in the form of an emulsion with water. The others mentioned are incorporated in solution in a suitable solvent, such as acetone, toluene, "Cellosolve," dioxane, ethyl alcohol, or the like, depending upon the particular binder which is used. A hydrophilic solvent is preferred, but a hydrophobic solvent may also be used. For a polyvinyl acetate binder, a suitable hydrophilic solvent is acetone and a suitable hydrophobic solvent is toluene. The amount of binder which is employed is insufficient to fill the voids between the particles of the composition for a reason which will be given hereinafter.

A filamentary material, such as hair or cotton linters, may be incorporated in the mass as a reenforcing agent to increase the strength of the body 12. The following is an example of a suitable composition for the depolarizing body:

| | Parts by weight |
|---|---|
| Manganese dioxide ore | 80 |
| Thermal acetylene black | 20 |
| Sodium chloride | 40 |
| Acetone containing 15% by weight of dissolved polyvinyl acetate | 14 |
| Horsehair | 1 |
| Water | 100 |

In the above composition, the only purpose of the water is to promote uniform mixing of the composition and facilitate pressing it into the desired form, and only sufficient is used to perform such function.

In making the body 12, the moist composition is first thoroughly mixed, and then is divided into portions each of which is sufficient to form one of the bodies. Each portion is placed in a mold and molded under heavy pressure into the form desired. A pressure of approximately 3 tons per square inch is satisfactory, and it is preferably applied slowly, and for this purpose a screw press is preferred, although a hydraulic press or punch press may be employed if desired. During molding, water is squeezed out of the mass, and, if desired, a sheet of absorbent paper may be inserted against each of the broad mold surfaces to absorb the water. After the molding operation, the body is removed from the mold and allowed to dry. It is preferably heated at a moderate temperature, for example 120° C., to evaporate the moisture and solvent and render it substantially dry. It may be stored indefinitely before use without impairing its suitability. The molded body is strong and rigid and is resistant to erosion or other attack by water and aqueous electrolyte solutions and may be immersed in such liquids for an indefinite period of time without disintegration or other impairment. The particles thereof are joined together primarily at their contacting surfaces and the voids between them are not filled by the binder. As a result, the body is porous and capable of readily absorbing the aqueous activating solution or electrolyte upon being brought in contact therewith.

As stated heretofore, the sodium chloride may be omitted from the composition in cases where the battery, in use, will be immersed in sea water or another aqueous solution containing an electrolyte compound satisfactory for activating purposes. Sea water is a solution containing approximately 2.6% of its weight of sodium chloride and an aqueous activating solution having a concentration approximately equivalent to or greater than the sodium chloride content of sea water is preferred.

The next element of the battery is the carbon cathode 13, which is a molded body of finely divided carbon or graphite and a suitable adhesive, such as rosin or pitch, similar in structure and composition to the carbon electrodes commonly employed in dry cells. The cathode is also resistant to disintegration or other impairment upon immersion in water or an aqueous electrolyte solution.

Proceeding downwardly from the first carbon cathode 13, elements similar to those described heretofore are arranged in reverse order until the next anode 10 is reached, the elements of similar composition being designated by the same numerals and being, in succession, the depolarizing body 12, the bibulous layer 11 and the anode 10. Proceeding downwardly from the second anode 10, the arrangement which has been described is duplicated. As a result, the two anodes at the ends of the battery each serve a single cell, while the remaining anodes and cathodes each serve as anode and cathode for two adjacent cells.

Annular discs 14 and 15 of a stiff electrically non-conductive material, such as phenol formaldehyde resin or the like, are arranged adjacent to the anodes 10 at the ends of the battery. As stated heretofore, the central openings of the elements coincide whereby a central space 16 is provided extending through the battery from one end to the other. The elements are held in juxtaposed relation and pressure contact with each other by means of an elongated tube 17 of rigid material such as metal which extends through the opening 16. The end portions of the tube 17 are externally threaded and nuts 18 and 19 are screwed upon said ends and into firm pressure engagement with end discs 14 and 15. The arrangement is such that the ends of the nuts bear with substantial pressure against the end discs, whereby the assembly of battery elements is held together in fixed position under firm pressure contact. The opening 16 through the assembled elements is larger than the tube 17 in cross section to form an electrical clearance space between the tube and the battery elements. A thin layer of paint, varnish, or a synthetic resin, such as phenol formaldehyde resin, may be applied to the exterior surface of tube 17 to provide further electrical insulation between the tube and the battery elements, or the tube 17 may be surrounded by a second tube of electrically non-conductive material, if that is desired, such tube being located in space 16.

Terminal members 21 are embedded in the edge portions of the cathodes 13 and project therefrom as shown. The cathodes 13 are connected to each other by a conductor 22. This may be accomplished by twisting the end of each terminal 21 about the conductor 22 and soldering the two together. Between the terminals 21, the conductor 22 is covered with a suitable electrical insulating material 23, such as rubber. At the opposite side of the battery, the anodes 10 are locally extended beyond the edges of the remaining elements of the battery as shown, and the projecting portions have openings therein through which a second conductor 24 passes. The conductor 24 is suitably connected to the anodes 10 by solder or other means, and the portions thereof between the anodes 10 are covered by a suitable insulating material 25. The conductors 22 and 24 connect the cells of the battery together in parallel, and serve as terminals of the battery and are adapted to be connected to the terminals of the signal or other apparatus (not shown) which is to be energized.

As stated heretofore, the battery may be stored indefinitely without suffering any substantial impairment of its energy delivering properties, and when it is to be placed in operation, it is immersed in water or an aqueous solution containing a suitable electrolyte compound dissolved therein. The specific battery which has been described heretofore may be immersed in plain water, and the latter will provide satisfactory activation. Batteries immersed in plain water have operated satisfactorily for 100 hours.

The depolarizing bodies 12 are liquid absorbent, and the liquid is absorbed readily into them whereby they become thoroughly moistened. The bibulous layers 11 are also liquid absorbent and absorb liquid and become moistened when their edges are exposed as shown. It is not essential, however, that the edges of the bibulous layers 11 be exposed, because the liquid which is absorbed by the depolarizing bodies 12 will pass to the bibulous layers 11 and be absorbed by them. For satisfactory liquid absorption, it is only necessary that a portion of the surface of either the bibulous layer 11 or depolarizing body 12 between the cathode and anode of each cell be exposed to the activating liquid upon immersion therein.

Means which are not shown may be provided which are adapted to cooperate with a part or parts of the battery, as for example, the central tube 17, to support the battery in the desired submerged position. The tube 17 may also be used to support an antennae for an electronic signal apparatus. The battery may be immersed continuously for an indefinite period of time without suffering disintegration of any of the parts or impairment other than that due to normal exhaustion, or, if it is on open circuit, to a moderate local action at the anodes.

The battery of the invention delivers a voltage per cell on open circuit somewhat in excess of 2 volts. When a battery of parallel connected cells is used to energize an electronic signal apparatus, an interrupter and a transformer may be employed to obtain the higher voltage required in the anode circuit. A battery of the character specifically described and illustrated comprising 12 cells connected in parallel and having a length of approximately 6 inches and a diameter of approximately 5 inches, upon immersion in ordinary tap water, is capable of delivering approximately 3 amperes continuously for more than 40 hours at a voltage above an end point of 1.2 volts.

While a single modification of the invention is specifically described, this is for illustrative purposes and the invention is not limited thereto, but modifications may be made within the spirit of the invention as the same is set forth in the appended claims.

For example, the cells may be connected in series instead of in parallel, in which case the cell elements are arranged in the well known manner in which the anode of one cell is in contact with the cathode of the adjacent cell, and the terminals of the battery are connected respectively to the anode of one end cell and to the cathode of the other end cell. In use, such a battery of series connected cells should be immersed in the activating liquid only long enough for proper moistening, which may require from one to ten minutes, after which it should be removed from the liquid when it will be in operative condition. The battery may also consist of a single cell instead of a plurality of cells.

In the construction shown, a spring member may be inserted between nut 19 and disc 15 to assist in maintaining the assembly under steady pressure throughout the life of the battery. Also, means other than that shown may be used for maintaining the cells in assembled relation. For example, the ends of tube 17, instead of carrying nuts as shown, may be turned outwardly to form flanges which bear with pressure against the ends of the assembly of elements. As an alternative, a container may be employed which encloses the exterior of the battery, such container being provided with suitable openings for the introduction of liquid upon immersion of the battery. Also, while the battery is especially adapted for immersion, it may be activated by the simple introduction of a quantity of activating liquid, in which case a closed container may be employed having an opening at the top for the introduction of the activating liquid, or a capsule of activating liquid may be provided which is adapted to be ruptured when it is desired to place the battery in use. Such alternative means for activating a deferred action battery are well known.

What is claimed is:

1. A multiple cell deferred action battery adapted for immersion in a body of activating liquid, comprising a plurality of electrically connected juxtaposed cells, said cells each comprising a plurality of juxtaposed flat elements comprising in succession an anode, a bibulous non-conductive layer, a rigid, liquid-absorbent, water-erosion resistant depolarizing body and a cathode, said depolarizing bodies having the edges thereof freely exposed to the space surrounding said battery, and means for maintaining said elements of said battery in pressure contact with each other.

2. A multiple cell deferred action battery adapted for immersion in a body of activating liquid, comprising a plurality of flat elements in juxtaposed relation and pressure contact with one another, the elements of each cell comprising in succession an anode, a layer of bibulous non-conductive material, a rigid, liquid-absorbent water-erosion resistant depolarizing body and a cathode, said depolarizing bodies having the edges thereof freely exposed to the space surrounding said battery.

IVAN C. BLAKE.
LAWRENCE H. HARRISS.
JOHN B. MULLEN.

REFERENCES CITED

The following references are of record in the file of this patent:

UNITED STATES PATENTS

| Number | Name | Date |
|---|---|---|
| 431,073 | Parrish | July 1, 1890 |
| 815,628 | Opperman | Mar. 20, 1906 |
| 1,467,240 | Doe | Sept. 4, 1923 |
| 1,488,908 | DeOlaneta | Apr. 1, 1924 |
| 1,601,457 | Smith | Sept. 28, 1926 |
| 1,696,873 | Wood | Dec. 25, 1928 |
| 2,050,173 | Gordon | Aug. 4, 1936 |
| 2,301,390 | Forsythe | Nov. 10, 1942 |
| 2,379,374 | Payne | June 26, 1945 |

FOREIGN PATENTS

| Number | Country | Date |
|---|---|---|
| 152,230 | Germany | June 14, 1904 |